US012572172B2

(12) United States Patent
Vajravel et al.

(10) Patent No.: US 12,572,172 B2
(45) Date of Patent: Mar. 10, 2026

(54) COLLECTING TELEMETRY DATA OF A DOCKING STATION

(71) Applicant: Dell Products L.P., Round Rock, TX (US)

(72) Inventors: Gokul Thiruchengode Vajravel, Bangalore (IN); Ramanaa H V, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 18/656,696

(22) Filed: May 7, 2024

(65) Prior Publication Data

US 2025/0348115 A1 Nov. 13, 2025

(51) Int. Cl.
*G06F 1/16* (2006.01)
*H04L 43/10* (2022.01)
*H04L 67/12* (2022.01)

(52) U.S. Cl.
CPC ............ *G06F 1/1632* (2013.01); *H04L 43/10* (2013.01); *H04L 67/12* (2013.01)

(58) Field of Classification Search
CPC ........ G06F 1/1632; H04L 43/10; H04L 67/12
See application file for complete search history.

(56) References Cited

U.S. PATENT DOCUMENTS

| | | | |
|---|---|---|---|
| 2016/0045111 A1* | 2/2016 | Menzel ................. | A61B 5/002 |
| | | | 340/870.01 |
| 2018/0242174 A1* | 8/2018 | Thotad ................ | H04L 41/0668 |
| 2024/0284142 A1* | 8/2024 | Kondapi ............... | H04W 4/023 |

* cited by examiner

*Primary Examiner* — Terrell S Johnson
(74) *Attorney, Agent, or Firm* — McDermott Will & Schulte LLP

(57) ABSTRACT

Collecting telemetry data of a docking station, including: storing i) an identifier of an information handling system and ii) user credentials of a user of the information handling system; registering management of the information handling system with an external computing device; registering management of the docking station with the external computing device; storing telemetry data associated with the information handling system; storing telemetry data associated with the docking station; determining that a heartbeat signal from the docking station has not been received within a time threshold, and in response: classifying the docking station as offline, and in response to the classifying: providing a request for i) the user credentials and ii) the telemetry data of the information handling system and the docking station; accessing the shared memory at the docking station; providing i) the user credentials and ii) the telemetry data of the information handling system and the docking station.

20 Claims, 4 Drawing Sheets

COLLECTING TELEMETRY DATA OF A DOCKING STATION

BACKGROUND

Field of the Disclosure

The disclosure relates generally to collecting telemetry data of a docking station.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A docking station is a peripheral device that allows a laptop or portable computer to connect to various external peripherals and accessories. It serves as a central hub, providing additional ports and functionality beyond what the laptop itself offers. Docking stations are commonly used in office environments, where users can quickly connect their laptops to a larger monitor, keyboard, mouse, and other devices. Docking stations typically include a variety of ports, such as USB, HDMI, DisplayPort, Ethernet, audio jacks, and power connectors. These ports allow users to connect external monitors, printers, external hard drives, and other peripherals without the hassle of plugging and unplugging individual cables each time.

SUMMARY

Innovative aspects of the subject matter described in this specification may be embodied in a method of collecting telemetry data of a docking station, including storing, by the information handling system and at a shared memory of the docking station, i) an identifier of an information handling system coupled to the docking station and ii) user credentials of a user of the information handling system; registering, by the information handling system, management of the information handling system with an external computing device; registering, by the docking station, management of the docking station with the external computing device; storing, by the information handling system and at the shared memory of the docking station, telemetry data associated with the information handling system; storing, by the docking station at the shared memory of the docking station, telemetry data associated with the docking station; determining, by the external computing device, that a heartbeat signal from the docking station has not been received within a time threshold, and in response: classifying the docking station as offline, and in response to the classifying: providing, by the external computing device and to the information handling system, a request for i) the user credentials and ii) the telemetry data of the information handling system and the docking station; accessing, by the information handling system, the shared memory at the docking station; and after accessing the shared memory, providing, by the information handling system and to the external computing device, i) the user credentials and ii) the telemetry data of the information handling system and the docking station.

Other embodiments of these aspects include corresponding systems, apparatus, and computer programs, configured to perform the actions of the methods, encoded on computer storage devices.

These and other embodiments may each optionally include one or more of the following features. For instance, storing, at the shared memory of the docking station, an identifier of the docking station. Identifying, by the information handling system, coupling of the information handling system with the docking station; and in response to identifying the coupling, storing, at the shared memory of the docking station, i) an identifier of the information handling system coupled with the docking station and ii) the user credentials of the user of the information handling system. Registering management of the information handling system with the external computing device further includes providing, by the information handling system and to the external computing device, the identifier of the information handling system, registering management of the docking station with the external computing device further includes providing, by the docking station and to the external computing device, the identifier of the docking station. The information handling system is in communication with the shared memory of the docking station over a stateless out-of-band (OOB) channel. The docking station is online, preventing, by the docking station, retrieval access of the shared memory by the information handling system over the OOB channel. The docking station is offline, exposing the shared memory to the information handling system over the OOB channel.

Particular implementations of the subject matter described in this specification can be implemented so as to realize one or more of the following advantages. For example, quick diagnostic and faster turnaround time to recover failed/bricked/offline docking stations is provided.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
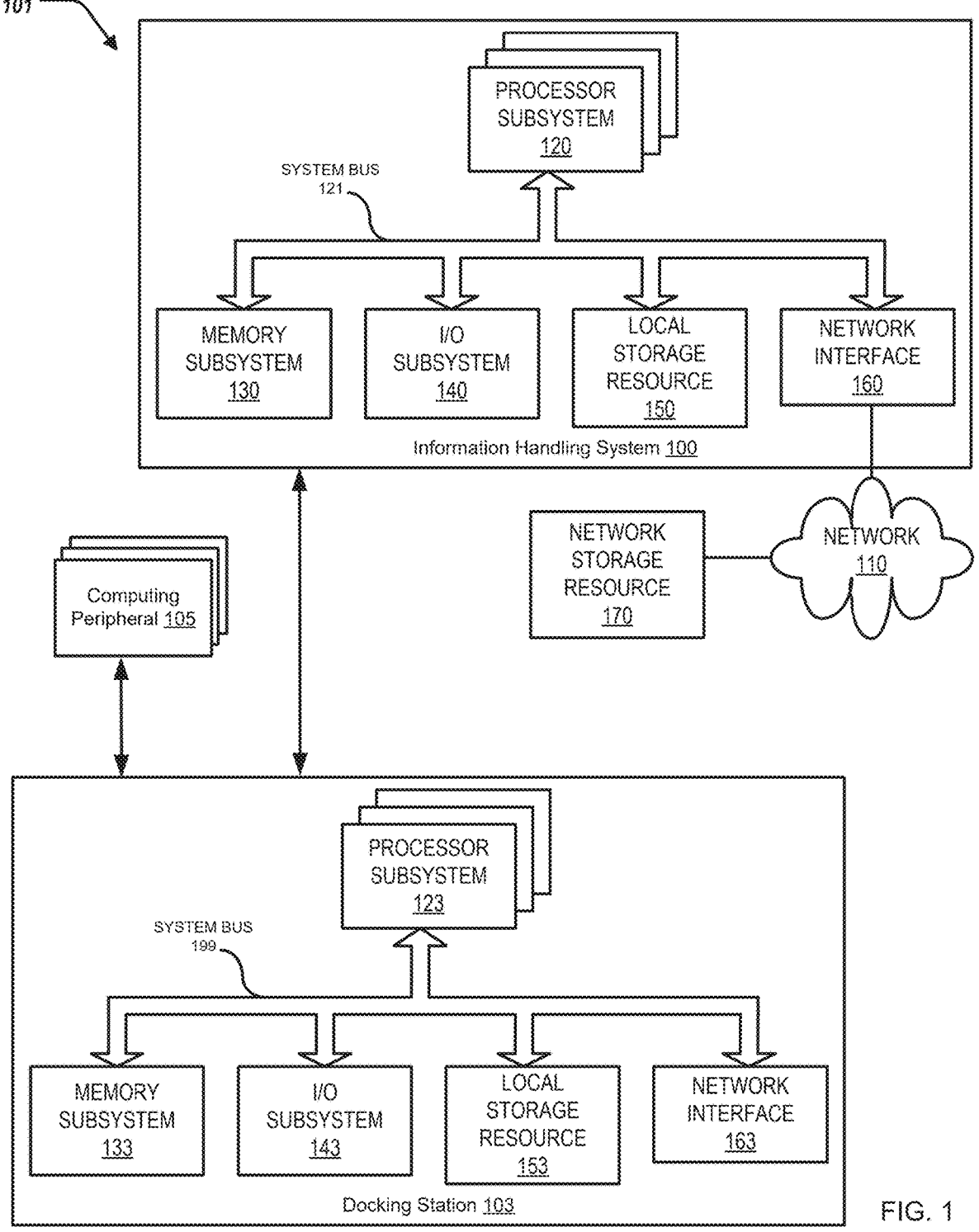
FIG. 1 is a block diagram of selected elements of an embodiment of an information handling system.

This disclosure discusses methods and systems for collecting telemetry data of a docking station. In short, when the docking station is running/executing an operating system (OS), there are potential scenarios that can cause OS failure at the docking station. This can, in turn, affect the functionality of the docking station to provide additional capabilities. When such failures occur, in order to recover/root cause analyze the issues real-time, telemetry data and other diagnostic information including logs and core dumps from the failed docking station are needed. For example, the docking station can fail or become bricked. For example, the docking station can crash/fail due to problems with the boot device, hardware failures, firmware failures, and/or outdated drivers. For example, the docking station can be subject to an "upgrade" (e.g., upgrade of the software/hardware/firmware of the docking station 204), and the upgrade is interrupted causing the docking station to move to a failed/bricked state.

Specifically, this disclosure discusses a system and a method for collecting telemetry data of a docking station, including storing, by the information handling system and at a shared memory of the docking station, i) an identifier of an information handling system coupled to the docking station and ii) user credentials of a user of the information handling system; registering, by the information handling system, management of the information handling system with an external computing device; registering, by the docking station, management of the docking station with the external computing device; storing, by the information handling system and at the shared memory of the docking station, telemetry data associated with the information handling system; storing, by the docking station at the shared memory of the docking station, telemetry data associated with the docking station; determining, by the external computing device, that a heartbeat signal from the docking station has not been received within a time threshold, and in response: classifying the docking station as offline, and in response to the classifying: providing, by the external computing device and to the information handling system, a request for i) the user credentials and ii) the telemetry data of the information handling system and the docking station; accessing, by the information handling system, the shared memory at the docking station; and after accessing the shared memory, providing, by the information handling system and to the external computing device, i) the user credentials and ii) the telemetry data of the information handling system and the docking station.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of a computing environment 101 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The environment 101 can further include a docking station 103 (or a "smart" docking station). The docking station 103 can be coupled to the information handling system 101—that is, the information handling system 101 can be physically coupled to the docking station 103 as well as communicatively coupled to the docking station 103. One or more peripherals 105 can be coupled (physically and communicatively) to the docking station 103. In short, the docking station 103 facilitates connection between the information handling system 101 and the peripherals 105 acting as a central hub to stream connectively and productivity of the information handling system 101. The peripherals 105 can include external displays, keyboards, mice, wired Ethernet, backup hard drives, printers, and the like.

The docking station 103 can include a processor subsystem 123, a memory subsystem 133, an I/O subsystem 143, a local storage resource 153, a network interface 163, and a system bus 199. The processor subsystem 123, the memory subsystem 133, the I/O subsystem 143, the local storage resource 153, the network interface 163, and the system bus 199 can be similar to (similar functionality) the processor subsystem 120, the memory subsystem 130, the I/O subsystem 140, the local storage resource 150, the network interface 160, and the system bus 121 of the information handling system 100.

Figure 2:
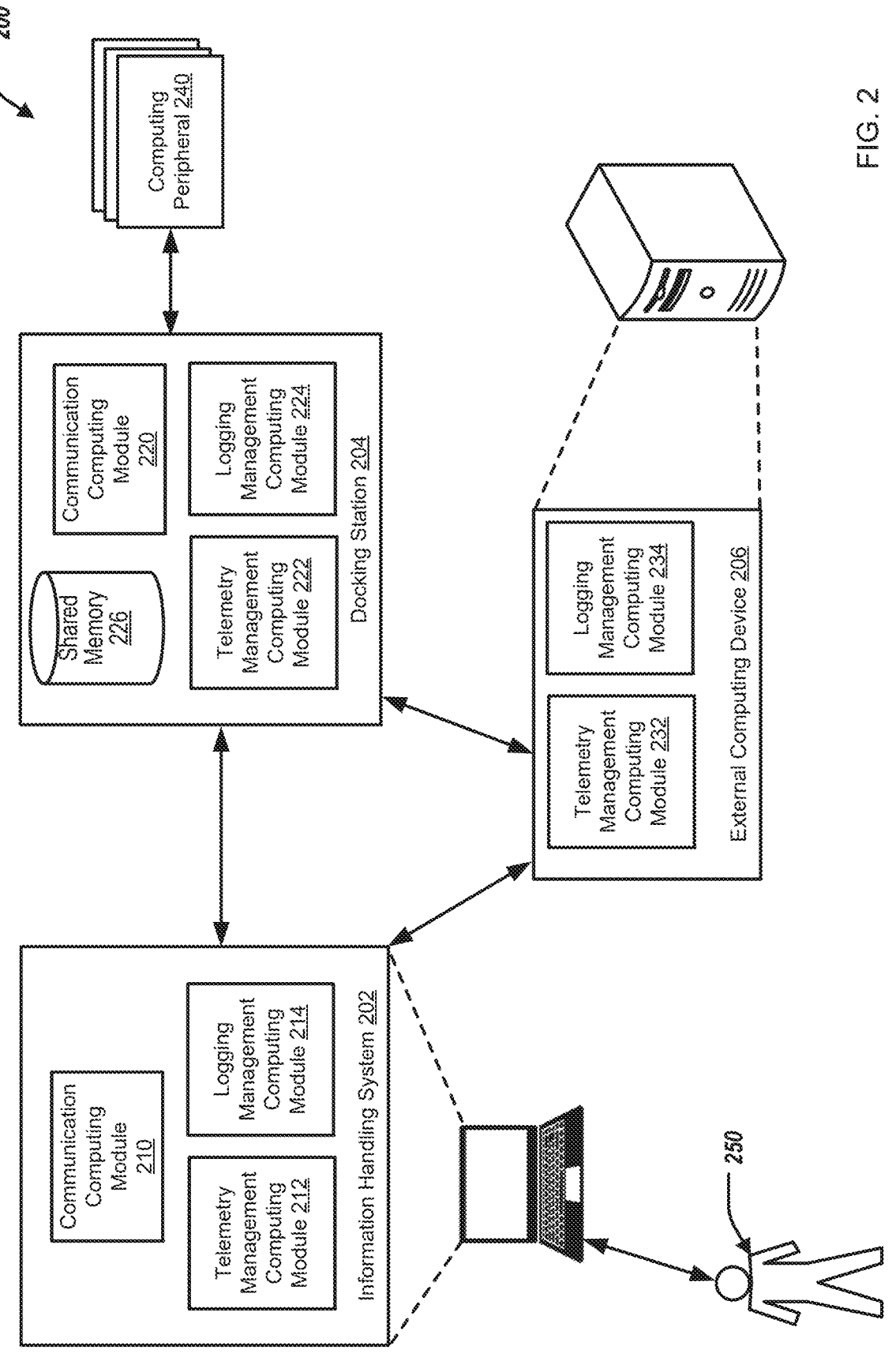
FIG. 2 illustrates a block diagram of a computing environment for collecting telemetry data of a docking station.

Turning to FIG. 2, FIG. 2 illustrates an environment 200 including an information handling system 202, a docking station 204, and an external computing device 206.

The information handling system 202 can include a communication computing module 210, a telemetry management computing module 212, and a logging management computing module 214. In some examples, the information handling system 202 is similar to, or includes, the information handling system 100 of FIG. 1.

The docking station 204 can include a communication computing module 220, a telemetry management computing module 222, and a logging management computing module 224. The docking station 204 can further include a shared memory 226. The shared memory 226 can include a persistent memory (such as non-volatile random-access memory (NVRAM) or erasable programmable read-only memory (EPROM)). In some examples, the docking station 204 is similar to, or includes, the docking station 103 of FIG. 1. In some examples, the docking station 204 and the shared memory 226 are included by the same physical enclosure.

The external computing device 206 can include a telemetry management computing module 232 and a logging management computing module 234. The external computing device 206 can a cloud-based computing device (or cloud-based server). The external computing device 206 can include one or more computing devices/computing servers.

The information handling system 202 can be in communication with the docking station 204. That is, the information handling system 202 can be physically and communicably coupled with the docking station 204. In some examples, the information handling system 202 is in communication with the shared memory 226 of the docking station 204 over a stateless out-of-band (OOB) channel. The information handling system 202 can further be in communication with the external computing device 206, e.g., over a network (the Internet).

The docking station 204 can be in communication with the information handling system 202. That is, the docking station 204 can be physically and communicably coupled with the information handling system 202. The docking station 204 can further be in communication with the external computing device 206, e.g., over a network (the Internet).

The external computing device 206 can be in communication with the information handling system 202 and the docking station 204, e.g., over a network (the Internet).

One or more computing peripherals 240 can be coupled to the docking station 204. The computing peripherals 240 can be similar to, or include, the computing peripherals 105 of FIG. 1.

In short, when the docking station 204 is running/executing an operating system (OS), there are potential scenarios that can cause OS failure at the docking station 204. This can, in turn, affect the functionality of the docking station 204 to provide additional capabilities. When such failures occur, in order to recover/root cause analyze the issues real-time, telemetry data and other diagnostic information including logs and core dumps from the failed docking station 204 are needed. For example, the docking station 204 can fail or become bricked. For example, the docking station 204 can crash/fail due to problems with the boot device, hardware failures, firmware failures, and/or outdated drivers. For example, the docking station 204 can be subject to an "upgrade" (e.g., upgrade of the software/hardware/firmware of the docking station 204), and the upgrade is interrupted causing the docking station 204 to move to a failed/bricked state.

To that end, the environment 200 can provide a method to remotely collect telemetry data from the docking station 202 (when failed) to allow quick diagnostics and rectification remotely. The data is collected from the information handling system 202—the telemetry data of the docking station 204 and the information handling system 202 is accessed through the information handling system 202 via a stateless OOB channel that runs on the docking station 204 that is accessible by the information handling system 202.

Figure 3:
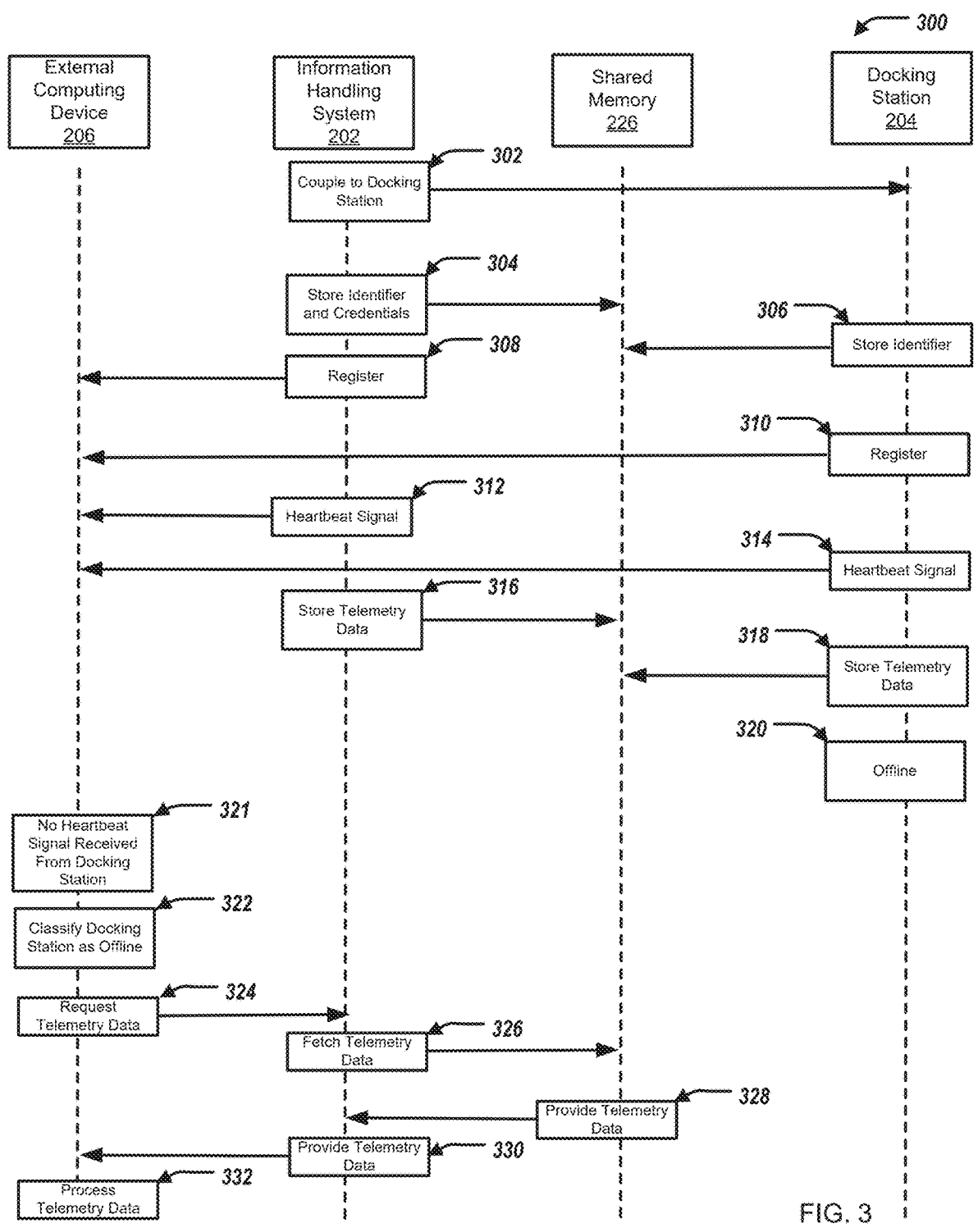
FIG. 3 illustrates a swim-lane diagram for collecting telemetry data of a docking station.

FIG. 3 illustrates a swim-lane diagram depicting selected elements of an embodiment of a method 300 for collecting telemetry data of a docking station. The method 300 may be performed by the information handling system 100, the docking station 103, the information handling system 202, the docking station 204, and/or the external computing device 206, and with reference to FIGS. 1-2. It is noted that certain operations described in method 300 may be optional or may be rearranged in different embodiments.

The information handling system 202, and in particular the communication computing module 210, can identify a coupling of the information handling system 202 with the docking station 204, at 302. That is, the information handling system 202 can be physically and communicatively coupled with the docking station 204. The information handling system 202, in response to the coupling with the docking station 204 can store, at the shared memory 226 of the docking station 204, i) an identifier of the information handling system 202, and ii) user credentials of a user 250 of the information handling system 202, at 304. Specifically, the user 250 can provide user credentials (e.g., username and password) to the information handling system 202 via an input device (such as a keyboard) to gain access to the information handling system 202. The communication computing module 210 can provide i) the identifier of the information handling system 202, and ii) user credentials of a user 250 to the docking station 204 such that data indicating i) the identifier of the information handling system 202, and ii) user credentials of a user 250 are stored at the shared memory 226.

Specifically, upon connection between the information handling system 202 and the docking station 204, the logging management computing module 214 can log the user identity (user credentials) of the user 250 as well as the device identity (identifier of the information handling system 202), with the communication computing module 210 providing such to store at the shared memory 226. Furthermore, when the user identity (user credentials) of the user 250 are stored at the shared memory 226, a date and time when the user 250 logs in and the information handling system 202 are coupled/connected to the docking station 204 are identified/stored.

The docking station 204 can store, at the shared memory 226, an identifier of the docking station 204, at 306. Specifically, the logging management computing module 224 can store, at the shared memory 226, the identifier of the docking station 204.

The information handling system 202 registers management of the information handling system 202 with the external computing device 206, at 308. Specifically, the information handling system 202, and in particular, the communication computing module 210, can provide the identifier of the information handling system 202 to the external computing device 206 such that the external computing device 206 can manage the information handling system 202. Management of the information handling system 202 can include "checking-in" by the information handling system 202 with the external computing device 206. Specifically, the external computing device 206 can manage the information handling system 202 by requesting heartbeat signals from the information handling system 202 that indicate the information handling system 202 is active, and running, described further herein. The logging management computing module 234 can log the identifier of the information handling system 202 for management of the information handling system 202.

The docking station 204 registers management of the docking station 204 with the external computing device 206, at 310. Specifically, the docking station 204, and in particular, the communication computing module 220, can provide the identifier of the docking station 204 to the external computing device 206 such that the external computing device 206 can manage the docking station 204. Management of the docking station 204 can include "checking-in" by the docking station 204 with the external computing device 206. Specifically, the external computing device 206 can manage the docking station 204 by requesting heartbeat signals from the docking station 204 that indicate the docking station 204 is active, and running, described further herein. The logging management computing module 234 can log the identifier of the docking station 204 for management of the docking station 204.

The information handling system 202, and in particular, the communication computing module 210, provides a heartbeat signal to the external computing device 206, at 312. In some examples, the information handling system 202 provides the heartbeat signal periodically (e.g., every 1 second, 1 minute). In some examples, the information handling system 202 provides the heartbeat signal automatically (e.g., independent of a request from the external computing device 206). In some examples, the information handling system 202 provides the heartbeat signal in response to a request from the external computing device 206. The heartbeat signal can indicate that the information handling system 202 is active, running, and operating under normal conditions.

The docking station 204, and in particular, the communication computing module 220, provides a heartbeat signal to the external computing device 206, at 314. In some examples, the docking station 204 provides the heartbeat signal periodically (e.g., every 1 second, 1 minute). In some examples, the docking station 204 provides the heartbeat signal automatically (e.g., independent of a request from the external computing device 206). In some examples, the docking station 204 provides the heartbeat signal in response to a request from the external computing device 206. The heartbeat signal can indicate that the docking station 204 is active, running, and operating under normal conditions.

The information handling system 202 stores, at the shared memory 226, telemetry data associated with the information handling system 202, at 316. Specifically, the telemetry management computing module 212 can identify telemetry data associated with the information handling system 202. The telemetry data can include performance metrics such as transaction/error rates, response times, CPU and memory usage, disk input/output, and network throughput. The communication computing module 210 can store the telemetry data at the shared memory 226 of the docking station 204. In some examples, the information handling system 202 can store the telemetry data at the shared memory 226 periodically (e.g., every 1 second, 1 minute). In some examples, the information handling system 202 can store the telemetry data at the shared memory 226 automatically (e.g., independent of a request from the external computing device 206 and/or the docking station 204). In some examples, the information handling system 202 can store the telemetry data at the shared memory 226 in response to a request from the external computing device 206 and/or the docking station 204. The information handling system 202 can store the telemetry data at the shared memory 226 multiple times over a time period.

The docking station 204 stores, at the shared memory 226, telemetry data associated with the docking station 204, at 318. Specifically, the telemetry management computing module 222 can identify telemetry data associated with the docking station 204. The telemetry data can include performance metrics such as transaction/error rates, response times, CPU and memory usage, disk input/output, and network throughput. The communication computing module 220 can store the telemetry data at the shared memory 226 of the docking station 204. In some examples, the docking station 204 can store the telemetry data at the shared memory 226 periodically (e.g., every 1 second, 1 minute). In some examples, the docking station 204 can store the telemetry data at the shared memory 226 automatically (e.g., independent of a request from the external computing device 206). In some examples, docking station 204 can store the telemetry data at the shared memory 226 in response to a request from the external computing device 206. The docking station 204 can store the telemetry data at the shared memory 226 multiple times over a time period.

The docking station 204 can go offline, at 320. That is, the docking station 204 can be come inactive, stop running (executing an operating system at the docking station 204), and/or not operate under normal conditions. For example, the docking station 204 can fail or become bricked. For example, the docking station 204 can crash/fail due to problems with the boot device, hardware failures, firmware failures, and/or outdated drivers. For example, the docking station 204 can be subject to an "upgrade" (e.g., upgrade of the software/hardware/firmware of the docking station 204), and the upgrade is interrupted causing the docking station 202 to move to a failed/bricked state.

The external computing device 206 can determine that the heartbeat signal from the docking station 204 has not been received within a time threshold, at 321. For example, the docking station 204 fails to send a heartbeat signal within a time threshold, or when a number of consecutive heartbeat signals are failed to be sent by the docking station 204, the external computing device 206 can determine that the heartbeat signal from the docking station 204 has not been received. The external computing device 206 can determine that a heartbeat signal from the docking station 204 has not been received with a time threshold, and/or determine that a number of consecutive heartbeat signals from the docking station 204 have not been received. For example, the external computing device 206 can determine that three consecutive heartbeat signals have not been received from the docking station 204.

The external computing device 206, in response to determining that the heartbeat signal from the docking station 204 has not been received with a time threshold, classifies the docking station 204 as offline, at 322. The external computing device 206, in response to classifying the docking station 204 as offline, provides a request for i) the user credentials and ii) the telemetry data of the information handling system 202 and the docking station 204, at 324. Specifically, the external computing device 206 provides the request for i) the user credentials and ii) the telemetry data of the information handling system 202 and the docking station 204 to the information handling system 202.

The information handling system 202 accesses the shared memory 226 at the docking station 204, at 326. Specifically, the communication computing module 210 obtains (fetches) i) the user credentials and ii) the telemetry data of the information handling system 202 and the docking station 204 that are stored at the shared memory 226 of the docking station 204. The information handling system 202 accesses the shared memory 226 via a stateless OOB channel that runs on the docking station 204 that is accessible by the information handling system 202.

The shared memory 226 provides i) the user credentials and ii) the telemetry data of the information handling system 202 and the docking station 204 to the information handling system 202 in response to the access by the information handling system 202, at 328.

The information handling system 202, after accessing the shared memory 226, provides, to the external computing device 206, i) the user credentials and ii) the telemetry data of the information handling system 202 and the docking station 204, at 330. Specifically, the communication computing module 210 provides, to the external computing device 206, i) the user credentials and ii) the telemetry data of the information handling system 202 and the docking station 204.

The external computing device 206 processes i) the user credentials and ii) the telemetry data of the information handling system 202 and the docking station 204, at 332. That is, the telemetry management computing module 232 processes i) the user credentials and ii) the telemetry data of the information handling system 202 and the docking station 204 to identify a source/cause of the offline status of the docking station 204.

In some further implementations, when the docking station 204 is online (the docking station 204 is active, running, and operating under normal conditions), the docking station 204 can prevent retrieval access of the shared memory 226 by the information handling system 202 over the OOB channel. Specifically, the docking station 204 can mask (disable chip-select) the shared memory 226 for the OOB channel access. That is, the docking station 204 can disable the chip-select of the shared memory 226 so that the memory 226 is not readable through the OOB channel (connected bus).

In some further implementations, when the docking station is offline (the docking station 204 is inactive, not running, and/or not operating under normal conditions), the shared memory 226 is exposed to the information handling system 202 over the OOB channel. Specifically, when the docking station 204 is offline (bricked), the chip-select of the shared memory 226 is enabled (as the docking station 204 is not online to disable such), and thus, the shared memory 226 is accessible by the information handling system 202 over the OOB channel.

Figure 4:
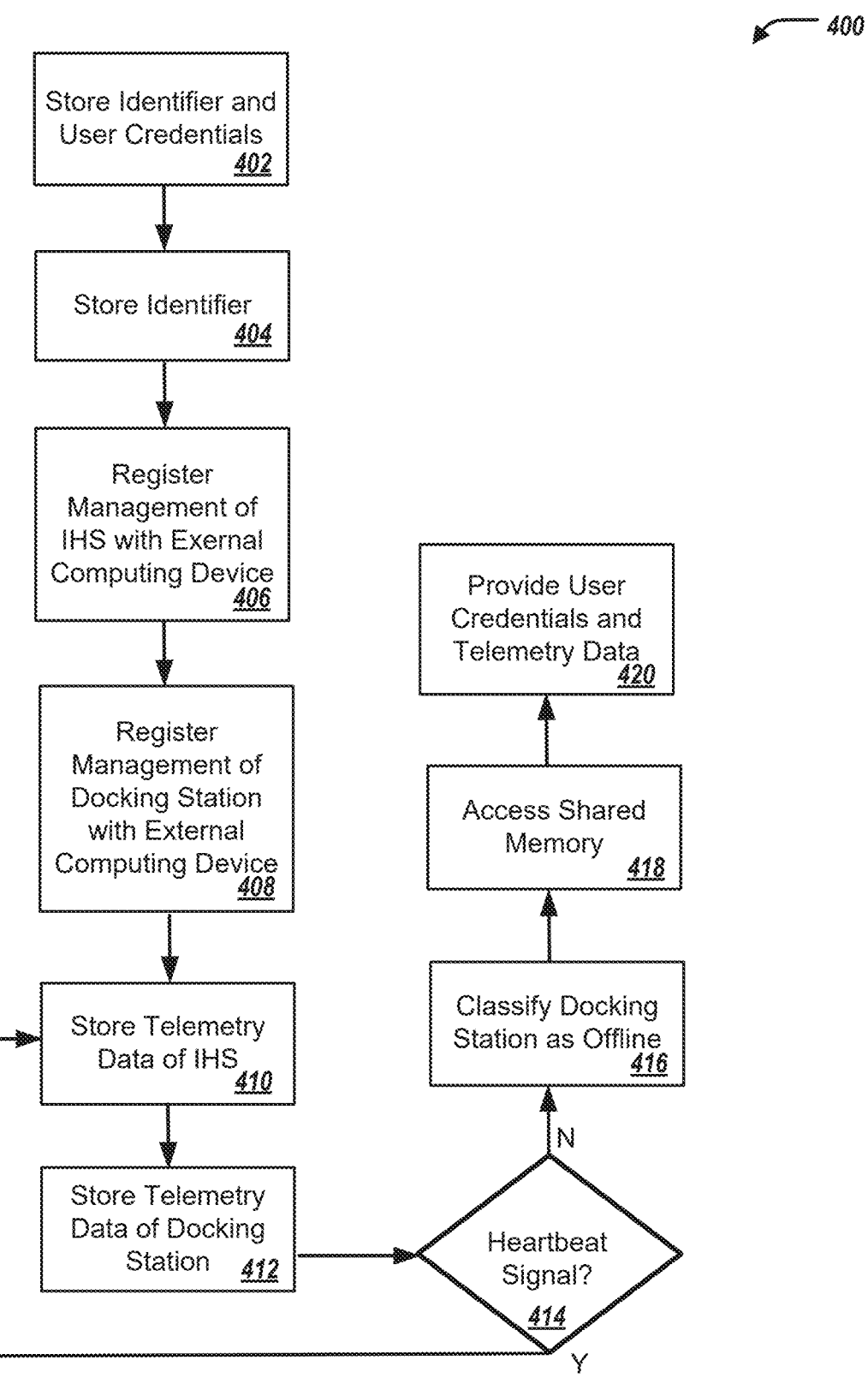
FIG. 4 illustrates a method for collecting telemetry data of a docking station.

FIG. 4 illustrates a flowchart depicting selected elements of an embodiment of a method 400 for collecting telemetry data of a docking station. The method 400 may be performed by the information handling system 100, the docking station 103, the information handling system 202, the docking station 204, and/or the external computing device 206, and with reference to FIGS. 1-2. It is noted that certain operations described in method 400 may be optional or may be rearranged in different embodiments.

The information handling system 202 can store, at the shared memory 226 of the docking station 204, i) an identifier of the information handling system 202, and ii) user credentials of a user 250 of the information handling system 202, at 402. The docking station 204 can store, at the shared memory 226, an identifier of the docking station, at 404. The information handling system 202 registers management of the information handling system 202 with the external computing device 206, at 406. The docking station 204 registers management of the docking station 204 with the external computing device 206, at 408. The information handling system 202 stores, at the shared memory 226, telemetry data associated with the information handling system 202, at 410. The docking station 204 stores, at the shared memory 226, telemetry data associated with the docking station 204, at 412. The external computing device 206 can determine whether the docking station 204 has provided a heartbeat signal with a time threshold, at 414. If the docking station 204 has provided a heartbeat signal within a time threshold, the method returns to step 410. If the docking station has not provided a heartbeat signal within a time threshold, the external computing device 206 classifies the docking station 204 as offline, at 416. The information handling system 202 accesses the shared memory 226 at the docking station 204, at 418. The information handling system 202 provides, to the external computing device 206, i) the user credentials and ii) the telemetry data of the information handling system 202 and the docking station 204, at 420.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of collecting telemetry data of a docking station, the method including:

storing, by the information handling system and at a shared memory of the docking station, i) an identifier of an information handling system coupled to the docking station and ii) user credentials of a user of the information handling system;

registering, by the information handling system, management of the information handling system with an external computing device;

registering, by the docking station, management of the docking station with the external computing device;

storing, by the information handling system and at the shared memory of the docking station, telemetry data associated with the information handling system;

storing, by the docking station at the shared memory of the docking station, telemetry data associated with the docking station;

determining, by the external computing device, that a heartbeat signal from the docking station has not been received within a time threshold, and in response:

classifying the docking station as offline, and in response to the classifying:

providing, by the external computing device and to the information handling system, a request for i) the user credentials and ii) the telemetry data of the information handling system and the docking station;

accessing, by the information handling system, the shared memory at the docking station; and after accessing the shared memory, providing, by the information handling system and to the external computing device, i) the user credentials and ii) the telemetry data of the information handling system and the docking station.

2. The computer-implemented method of claim 1, further including storing, at the shared memory of the docking station, an identifier of the docking station.

3. The computer-implemented method of claim 1, further including:

identifying, by the information handling system, coupling of the information handling system with the docking station; and in response to identifying the coupling, storing, at the shared memory of the docking station, i) an identifier of the information handling system coupled with the docking station and ii) the user credentials of the user of the information handling system.

4. The computer-implemented method of claim 1, wherein registering management of the information handling system with the external computing device further includes providing, by the information handling system and to the external computing device, the identifier of the information handling system, wherein registering management of the docking station with the external computing device further includes providing, by the docking station and to the external computing device, the identifier of the docking station.

5. The computer-implemented method of claim 1, wherein the information handling system is in communication with the shared memory of the docking station over a stateless out-of-band (OOB) channel.

6. The computer-implemented method of claim 5, when the docking station is online, preventing, by the docking station, retrieval access of the shared memory by the information handling system over the OOB channel.

7. The computer-implemented method of claim 6, when the docking station is offline, exposing the shared memory to the information handling system over the OOB channel.

8. A computing environment, including:

an information handling system comprising a processor having access to memory media storing instructions executable by the processor to perform operations;

a docking station connected to the information handling system, the docking station comprising a processor having access to memory media storing instructions executable by the processor to perform operations, the docking station including a shared memory;

an external computing device in communication with the docking station and the information handling system, the external computing device comprising a processor having access to memory media storing instructions executable by the processor to perform operations;

wherein the information handling system is configured to perform operations:

storing, at a shared memory of the docking station, i) an identifier of an information handling system coupled to the docking station and ii) user credentials of a user of the information handling system;

registering management of the information handling system with an external computing device;

storing, at the shared memory of the docking station, telemetry data associated with the information handling system;

wherein the docking station is configured to perform operations:

registering management of the docking station with the external computing device;

storing, at the shared memory of the docking station, telemetry data associated with the docking station;

wherein the external computing device is configured to perform operations:

determining that a heartbeat signal from the docking station has not been received within a time threshold, and in response:

classifying the docking station as offline, and in response to the classifying:

providing, to the information handling system, a request for i) the user credentials and ii) the telemetry data of the information handling system and the docking station;

wherein, further in response to classifying the docking station as offline, the information handling system is configured to perform operations:

accessing the shared memory at the docking station; and after accessing the shared memory, providing, to the external computing device, i) the user credentials and ii) the telemetry data of the information handling system and the docking station.

9. The computing environment of claim 8, wherein the docking station is configured to perform operations storing, at the shared memory of the docking station, an identifier of the docking station.

10. The computing environment of claim 8, wherein the information handling system is configured to perform operations:

identifying coupling of the information handling system with the docking station; and in response to identifying the coupling, storing, at the shared memory of the docking station, i) an identifier of the information handling system coupled with the docking station and ii) the user credentials of the user of the information handling system.

11. The computing environment of claim 8, wherein registering management of the information handling system with the external computing device further includes providing, by the information handling system and to the external computing device, the identifier of the information handling system, wherein registering management of the docking station with the external computing device further includes providing, by the docking station and to the external computing device, the identifier of the docking station.

12. The computing environment of claim 8, wherein the information handling system is in communication with the shared memory of the docking station over a stateless out-of-band (OOB) channel.

13. The computing environment of claim 12, wherein the docking station is configured to perform operations:

when the docking station is online, preventing retrieval access of the shared memory by the information handling system over the OOB channel.

14. The computing environment of claim 13, wherein the docking station is configured to perform operations:

when the docking station is offline, exposing the shared memory to the information handling system over the OOB channel.

15. A non-transitory computer-readable medium storing software comprising instructions executable by one or more computers which, upon such execution, cause the one or more computers to perform operations comprising:

storing, at a shared memory of the docking station, i) an identifier of an information handling system coupled to the docking station and ii) user credentials of a user of the information handling system;

registering, by the information handling system, management of the information handling system with an external computing device;

registering, by the docking station, management of the docking station with the external computing device;

storing, by the information handling system and at the shared memory of the docking station, telemetry data associated with the information handling system;

storing, by the docking station at the shared memory of the docking station, telemetry data associated with the docking station;

determining, by the external computing device, that a heartbeat signal from the docking station has not been received within a time threshold, and in response:

classifying the docking station as offline, and in response to the classifying:

providing, by the external computing device and to the information handling system, a request for i)

the user credentials and ii) the telemetry data of the information handling system and the docking station;

accessing, by the information handling system, the shared memory at the docking station; and after accessing the shared memory, providing, by the information handling system and to the external computing device, i) the user credentials and ii) the telemetry data of the information handling system and the docking station.

16. The non-transitory computer-readable medium of claim 15, the operations further including storing, at the shared memory of the docking station, an identifier of the docking station.

17. The non-transitory computer-readable medium of claim 15, the operations further including:

identifying, by the information handling system, coupling of the information handling system with the docking station; and in response to identifying the coupling, storing, at the shared memory of the docking station, i) an identifier of the information handling system coupled with the docking station and ii) the user credentials of the user of the information handling system.

18. The non-transitory computer-readable medium of claim 15, wherein registering management of the information handling system with the external computing device further includes providing, by the information handling system and to the external computing device, the identifier of the information handling system, wherein registering management of the docking station with the external computing device further includes providing, by the docking station and to the external computing device, the identifier of the docking station.

19. The non-transitory computer-readable medium of claim 15, wherein the information handling system is in communication with the shared memory of the docking station over a stateless out-of-band (OOB) channel.

20. The non-transitory computer-readable medium of claim 19, when the docking station is online, preventing, by the docking station, retrieval access of the shared memory by the information handling system over the OOB channel.

* * * * *